US011752535B2

(12) United States Patent
Cheng et al.

(10) Patent No.: US 11,752,535 B2
(45) Date of Patent: Sep. 12, 2023

(54) HOT METAL GAS FORMING AND QUENCHING SYSTEM AND PROCESS THEREFOR

(71) Applicant: INTELLIGENT AEROSPACE MANUFACTURING TECHNOLOGY (BEIJING) CO., LTD., Beijing (CN)

(72) Inventors: Pengzhi Cheng, Beijing (CN); Gang Cheng, Beijing (CN); Yulong Ge, Beijing (CN); Shangwen Ruan, Beijing (CN); Yasu Xie, Beijing (CN); Zenghua Wang, Beijing (CN); Xiaohang Jiang, Beijing (CN)

(73) Assignee: INTELLIGENT AEROSPACE MANUFACTURING TECHNOLOGY (BEIJING) CO., LTD., Beijing (CN)

( * ) Notice: Subject to any disclaimer, the term of this patent is extended or adjusted under 35 U.S.C. 154(b) by 105 days.

(21) Appl. No.: 17/434,618

(22) PCT Filed: Mar. 4, 2020

(86) PCT No.: PCT/CN2020/077674
§ 371 (c)(1),
(2) Date: Aug. 27, 2021

(87) PCT Pub. No.: WO2020/177694
PCT Pub. Date: Sep. 10, 2020

(65) Prior Publication Data
US 2022/0168792 A1   Jun. 2, 2022

(30) Foreign Application Priority Data

Mar. 4, 2019   (CN) .......................... 201910160324.4

(51) Int. Cl.
*B21D 26/047* (2011.01)
*B21D 43/00* (2006.01)
*B21D 43/13* (2006.01)

(52) U.S. Cl.
CPC ......... *B21D 26/047* (2013.01); *B21D 43/006* (2013.01); *B21D 43/13* (2013.01)

(58) Field of Classification Search
CPC .... B21D 26/047; B21D 43/006; B21D 43/04; B21D 43/05; B21D 43/13
See application file for complete search history.

(56) References Cited

U.S. PATENT DOCUMENTS 3,998,087 A * 12/1976 Schumacher ........ B21D 24/005
72/453.01
4,604,021 A * 8/1986 Werner .................. B21D 43/05
414/753.1
(Continued)

FOREIGN PATENT DOCUMENTS

CN   101507995 A   8/2009
CN   106457346 A   2/2017
(Continued)

OTHER PUBLICATIONS

Translation of International Search Report for corresponding PCT/CN2020/077674, dated May 8, 2020.

Primary Examiner — Teresa M Ekiert
(74) Attorney, Agent, or Firm — Bayramoglu Law Offices LLC

(57) ABSTRACT

A hot metal gas forming and quenching system and process thereof are provided. The system includes a hydraulic press, a die assembly, a rapid heating module, and a rapid cooling module. The die assembly includes a progressive die realizing the hot gas bulging and rapid cooling of the workpiece. Through the above system and the process, making pipes with uncoated plates has a lower cost than with coated and plated steel plates, with fewer structural defects and process risks. By using a progressive die, a resistance heating process and hot gas bulging and quenching processes are performed in parallel, and the material is loaded progressively, thereby having a fast pace and a greatly improved efficiency. A heating state of parts is fully protected, oxidation is avoided, and no coating is required. After the workpiece is formed, it can be directly welded to a car body without shot blasting.

13 Claims, 11 Drawing Sheets

(56) References Cited

U.S. PATENT DOCUMENTS

| | | | |
|---|---|---|---|
| 5,353,618 A | 10/1994 | Roper | |
| 9,433,992 B1 | 9/2016 | Tauzer | |
| 2002/0003011 A1 | 1/2002 | Dykstra et al. | |
| 2004/0200550 A1 | 10/2004 | Pfaffmann et al. | |
| 2010/0319428 A1 | 12/2010 | Gomez et al. | |

FOREIGN PATENT DOCUMENTS

| | | | |
|---|---|---|---|
| CN | 107570614 A | 1/2018 | |
| CN | 108585451 A | 9/2018 | |
| JP | 2003154415 A | 5/2003 | |
| JP | 2016036816 A | 3/2016 | |
| JP | 2018051622 A | 4/2018 | |
| WO | 2008078356 A1 | 7/2008 | |
| WO | 2013099774 A1 | 7/2013 | |
| WO | 2016190260 A1 | 12/2016 | |
| WO | 2018181587 A1 | 10/2018 | |

\* cited by examiner ized pressing blocks, conductive pressing plates and cooling water pipes, which corresponds to a situation in which the workpiece needs to be heated in the die.

HOT METAL GAS FORMING AND QUENCHING SYSTEM AND PROCESS THEREFOR

CROSS REFERENCE TO THE RELATED APPLICATIONS

This application is the national phase entry of International Application No. PCT/CN2020/077674, filed on Mar. 4, 2020, which is based upon and claims priority to Chinese Patent Application No. 201910160324.4, filed on Mar. 4, 2019, the entire contents of which are incorporated herein by reference.

TECHNICAL FIELD

The present disclosure relates to the technical field of metal plastic processing, and in particular relates to a hot metal gas forming and quenching system and a process therefor.

BACKGROUND

Current trends of automobile manufacturing are changing towards greater weight reduction goals, in order to ultimately achieve more significant energy savings and reduce emissions. Lightweight is one of important ways to realize energy saving and emission reduction of traditional vehicles, and to solve the problem of short endurance mileage of current new energy vehicles.

Ultra-high-strength steel, high-strength aluminum alloy, high-strength magnesium alloy and other materials are key materials that constitute lightweight car bodies. These materials have problems of low plasticity, large resilience, and easy cracking during a forming process. The traditional technology is difficult to solve a problem that these materials are formed precisely with high quality. Hot Metal Gas Forming & Quenching (HMGF&Q) provides a new way for body structure engineers to process ultra-high-strength steel, high-strength aluminum alloys and other materials. This process fully combines the advantages of a hydraulic forming process, a blow molding process and a press hardening forming process and other processes, which makes the material formed at a high temperature through rapid heating, and quickly and synchronously complete the in-die quenching and strengthening, thereby improving the forming performance while improving the forming quality and efficiency. It is especially suitable for the manufacture of high-rigidity enclosed cross-section space frame structures such as automobile A-pillars, B-pillars, anti-collision beams, torsion beams, etc., and raises body lightweight and structural strength to a new level.

The existing research results show that the HMGF&Q forming process can increase a strength of a product obtained by forming a high-strength steel pipe through internal pressure, from 800 MPa to about 1500 MPa. The process route is feasible and the application prospect is good. However, most of the existing technologies do not have anti-oxidant gas protection devices. As a result, the following process problems need to be further solved: (1) a heating cost for continuous furnace is high, which adopts steel pipes with protective coatings such as aluminum-silicon coating. A high cost and welding inclusions affect the quality of the formed products. The high energy consumption of the heating and heat preservation system for the pipes in the gas protection atmosphere of continuous furnace also increases the energy consumption of the system. The difficult problem of pipes made of anti-corrosion coating plate also increases the cost; (2) adopting uncoated plates to make pipes, heating by resistance self-heating method, and transferring the heated products into the die by the robot have the disadvantages of gas oxidation and slow production cycle during the transfer process; (3) the safety problems of ultra-high pressure gas pressure and high temperature heating equipment have not been reliably solved: (4) at the hot gas bulging and quenching forming station, resistance heating is carried out first, and followed by gas bulging forming and quenching, which has the problems such as series connection of processes, long processing time, and oxidation of product surfaces. These problems not only lead to dangerous equipment systems, high energy consumption, and high costs, but also make working environment of workshops hotter and noisier. In the end, this technology is difficult to popularize.

Aiming at the shortcomings of the prior art, the present disclosure is proposed.

SUMMARY

One of the objectives of the present disclosure is to provide a hot metal gas forming and quenching system, including a hydraulic press, a die assembly, a rapid heating module and a rapid cooling module and a control system. The die assembly, the rapid heating module and the rapid cooling module are arranged on the hydraulic press or around the hydraulic press; the die assembly includes a progressive die which realizes hot gas bulging and rapid cooling of workpieces.

Further, the die assembly includes a core component and automatic loading and unloading modules; the automatic loading and unloading modules are respectively arranged on two sides of the core component to load and unload the workpieces for the core component. The core component includes a lower die bottom plate, a lower die holder, a lower die insert, an upper die top plate, an upper die holder, an upper die insert, a progressive die, side pushing sealing oil cylinder modules and electrode compression cylinder modules. The lower die holder, the lower die insert, the progressive die, the upper die insert, the upper die holder and the upper die top plate are arranged on the lower die bottom plate sequentially from top to bottom. The progressive die includes a heating station and a hot gas bulging and quenching station. The die combines a hot gas bulging station and a quenching forming station, thereby greatly reducing processing time and avoiding surface oxidation of products.

Further, the progressive die includes a feeding bottom plate, a feeding module and a feeding pallet. The feeding module drives the feeding bottom plate to translate from side to side, and drives the feeding pallet to move up and down. The feeding module includes progressive die drives, progressive die drive guide bars, lifting hydraulic cylinders, rotatable compression cylinders and rotatable pressure plates. The feeding pallet is provided with a plurality of die cavities for accommodating ends of the workpieces, and with a plurality of hole slots for accommodating the rotatable compression cylinders.

Optionally, the rapid heating module includes a direct current power supply and conductive clamping blocks, which corresponds to a situation in which two ends of a workpiece are not heated.

Optionally, the rapid heating module includes a direct current power supply, conductive compression blocks, insulating clamping blocks and electrode compression cylinders, which corresponds to a situation in which two ends of a workpiece are heated.

Further, the rapid cooling module includes an upper die inlet water channel, an upper die annular cooling water channel, an upper die outlet water channel, a lower die inlet water channel, a lower die annular cooling water channel, and a lower die outlet water channel. The upper die annular cooling water channel is formed by a gap formed between the upper die insert and the die insert. The lower die annular cooling water channel is formed by a gap between the lower die insert and the die insert.

Further, the system further includes a safety protection and sealing module, and a working area of the die assembly is arranged in a positive pressure space formed by the safety protection and sealing module.

Further, the safety protection and sealing module includes a loading transition sealing gas chamber, a safety protection and sealing compartment, and an unloading transition sealing gas chamber. The loading transition sealing gas chamber and the unloading transition sealing gas chamber are arranged on two sides of the safety protection and sealing compartment. The safety protection and sealing compartment forms a positive pressure sealing environment in which the die assembly is provided.

Further, the safety protection and sealing compartment is provided with a pressure relief hole.

Further, a pressure relief film is pasted on the inner side wall of the safety protection and sealing compartment where the pressure relief hole is opened, and is fixed by fasteners.

Further, the system further includes a control system which controls the hydraulic press, the die assembly, the rapid heating module and the rapid cooling module.

Further, the system further includes an ultrahigh pressure gas circulation control module which includes a nitrogen tank assembly, a first two-way booster, a high-pressure gas storage tank, an inflation valve, a gas cooler, a rapid boosting cylinder, a low-pressure gas storage tank and a second two-way booster. The first two-way booster is connected to the nitrogen tank assembly, the high-pressure gas storage tank and the second two-way booster, and the high-pressure gas storage tank is connected to the inflation valve. The gas cooler is connected to a rapid boosting oil cylinder, the rapid boosting oil cylinder is connected to the low-pressure gas storage tank, and the low-pressure gas storage tank is connected to the second two-way booster.

One of the objections of the present disclosure is to provide a hot gas bulging and rapid cooling strengthening process for metal pipes, comprising the following steps;

step 1) loading metal pipe workpieces into a die of a die assembly in a hot gas bulging forming machine via automatic loading and unloading modules, heating the metal pipe workpieces quickly by a direct current power supply of a rapid heating module at a heating station;

step 2) delivering the heated workpieces to a hot gas bulging and quenching station, firstly performing a hot gas bulging operation, then performing a quenching operation;

step 3) taking the workpieces out of the die through the automatic loading and unloading modules.

Optionally, when the metal pipe workpieces are made of titanium, the quenching operation in the step 2) is omitted.

Optionally, introducing nitrogen, carbon dioxide or inert gas into the die of the die assembly to protect the workpieces during heating from oxidation.

Further, the die of the die assembly is a progressive die.

Further, the die assembly is arranged in a sealing environment created by a safety protection and sealing module.

Optionally, a heat preservation step is provided between the step 2) and the step 3), quenched workpieces are delivered to an unloading and heat preservation station, and kept at a desired temperature for a predetermined time.

Optionally, the hot gas bulging is replaced by liquid bulging, and high-pressure liquid is filled into the workpieces to complete bulging of the workpieces.

Further, heating, gas bulging, rapid cooling strengthening and heat preservation of the workpieces are performed on the die assembly.

The present disclosure has the following beneficial effects. 1. Making pipes with uncoated plates has a lower cost than making pipes with coated and plated steel plates, and fewer structural defects are generated. 2. By using a progressive die, a resistance heating process, and hot gas bulging and quenching processes are performed in parallel, and the material is loaded progressively, thereby having a fast pace and a greatly improved efficiency. 3. A heating state of parts is fully protected, oxidation is avoided, and no coating is required. After the workpiece is formed, it can be directly welded to a car body without shot blasting, which greatly saves costs. 4. A safety protection measure of directed destruction is adopted to improve the safety.

BRIEF DESCRIPTION OF THE DRAWINGS

FIGS. 14A-14B are schematic structural diagrams of an annular cooling water channel of the rapid cooling module of the embodiment of the hot metal gas forming and quenching system according to the present disclosure, in which FIG. 14A is a cross-sectional schematic diagram, and FIG. 14B is a longitudinal section schematic diagram.

List of reference numbers: 100 hydraulic press, 110 lower beam, 120 moving table, 130 pulling rod, 140 upright post, 150 upper beam, 160 main cylinder, 161 piston rod, 170 die flange, 180 flange guide rod, 190 slider, 191 adapting rod, 2A loading station, 2B heating station, 2C hot gas bulging and quenching station, 2D unloading and heat preservation station, 200 die assembly, 201 ferry loading trolley, 202 ferry unloading trolley, 2021 linear drive, 2022 jacking cylinder, 2023 pallet, 2024 workpiece clamping plate, 203 ferry loading and turning manipulator, 204 ferry unloading and turning manipulator, 2041 linear drive, 2042 rotatable drive, 2043 rotatable arm, 2044 clamping gripper, 210 lower die bottom plate, 211 guide rail, 220 lower die holder, 230 lower die insert, 240 upper die top plate, 250 upper die holder, 260 upper die insert, 261 deep groove, 270 progressive die, 271 feeding bottom plate, 272 feeding module, 2721 progressive die drive, 27211 drive motor, 27212 reducer, 27213 gear, 27214 rack, 2722 progressive die drive guide bar, 2723 lifting hydraulic cylinder, 2724 rotatable compression cylinder, 2725 rotatable pressure plate, 273 feeding pallet, 2731 die cavity, 2732 hole slot, 2733 guide post, 280 side pushing sealing oil cylinder module, 281 side pushing sealing oil cylinder, 282 side push sealing head, 290 electrode compression cylinder module, 300 rapid heating module, 310 direct current power supply, 320 conductive clamping block, 330 conductive compression module, 340 insulating clamping block, 350 electrode compression cylinder, 400 rapid cooling module, 410 upper die inlet water channel, 420 upper die annular cooling water channel, 430 upper die outlet water channel, 440 lower die inlet water channel, 450 lower die annular cooling water channel, 460 lower die outlet water channel, 470 die insert, 500 safety protection and sealing module, 510 loading transition sealing gas chamber, 520 safety protection and sealing compartment, 521 pressure relief hole, 522 pressure relief film, 523 sealing compartment side wall, 524 third sealing ring, 525 fastener, 530 unloading transition sealing chamber, 531 upper cover plate, 5311 flange, 532 first sealing ring, 533 second sealing ring, 540 sealing hole, 600 total control system, 700 ultra-high pressure gas circulation control module, 701 check valve, 710 nitrogen tank assembly, 720 first two-way booster, 730 high pressure gas storage tank, 740 inflation valve, 750 gas cooler, 760 rapid boosting oil cylinder, 770 low-pressure gas storage tank, 780 second two-way booster, 790 low pressure cylinder cavity body, D distance, W-workpiece.

DETAILED DESCRIPTION OF THE EMBODIMENTS

The present disclosure is further described below in combination with the accompanying drawings.

Figure 1:
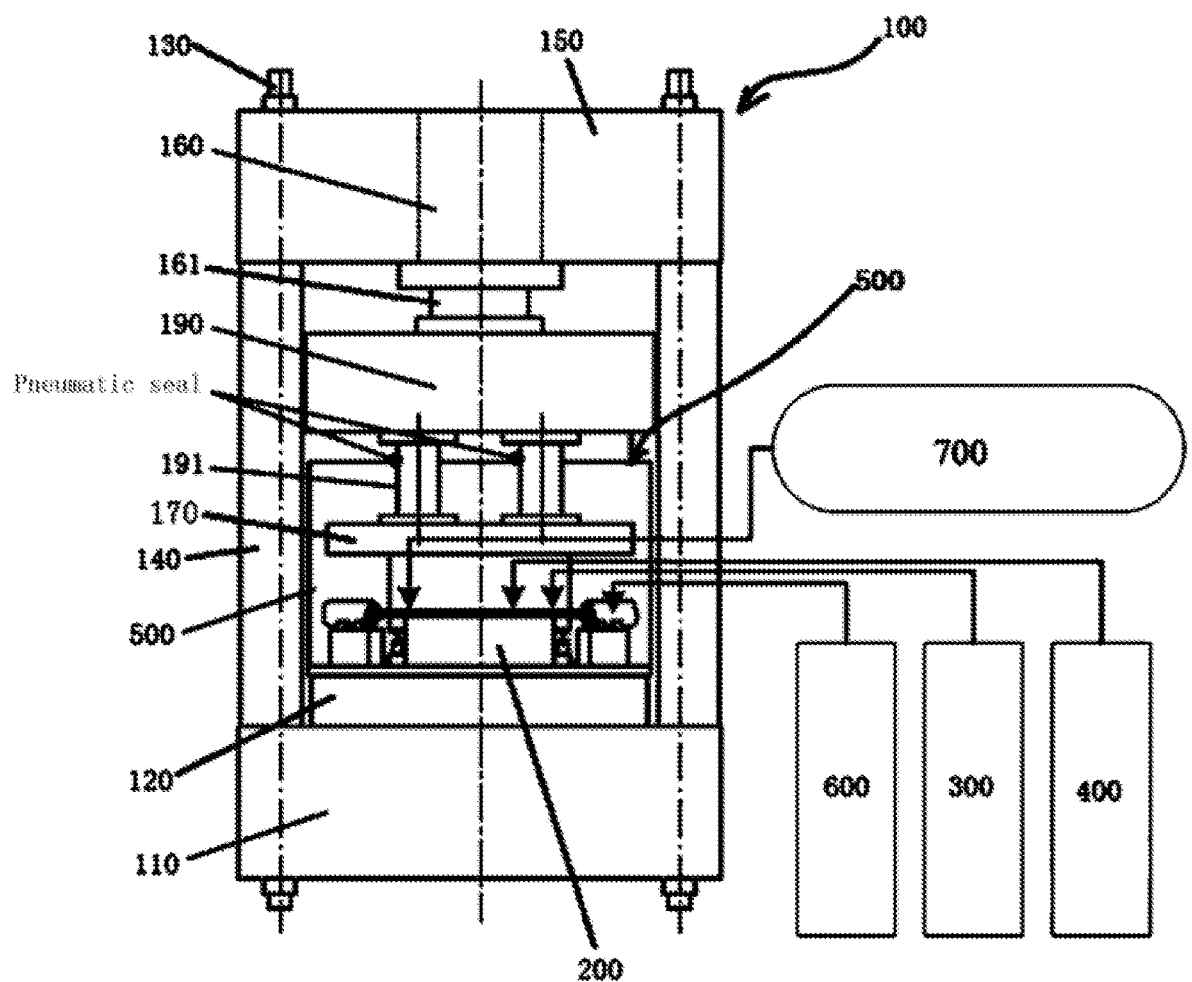
FIG. 1 is a schematic structural diagram of an embodiment of a hot metal gas forming and quenching system according to the present disclosure.

As shown in FIG. 1, it is provided a hot metal gas forming and quenching system, including a hydraulic press 100, a die assembly 200, a rapid heating module 300 and a rapid cooling module 400. The die assembly 200, the rapid heating module 300 and the rapid cooling module 400 are all arranged on the hydraulic press 100 or around the hydraulic press 100. The die assembly 200 includes a progressive die 270, which can realize hot gas bulging and rapid cooling of a workpiece W. The system also includes a safety protection and sealing module 500, a control system 600, and an ultra-high pressure gas circulation control module. A working area of the die assembly 200 is provided in a positive pressure space formed by the safety protection and sealing module 500. The control system 600 controls the hydraulic press 100, the die assembly 200, the rapid heating module 300 and the rapid cooling module 400. The ultra-high pressure gas circulation control module 700 provides the die assembly 200 with high pressure gas for gas bulging of the workpieces W.

The hydraulic press 100 can be a hydraulic press with a slider (as shown in FIG. 1), including a lower beam 110, a moving table 120, pulling rods 130, upright columns 140, an upper beam 150, a main cylinder 160, a die flange 170 and a slider 190. The lower beam 110 and the upper beam 150 are supported and separated by the upright columns 140 to form a space for accommodating the moving table 120, the die flange 170 and the slider 190. The lower beam 110, the upright columns 140 and the upper beam 150 are fastened by the pulling rods 130. The moving table 120 is arranged on the lower beam 110. The main cylinder 160 is arranged on the upper beam 150. A lower end of a piston rod 161 of the main cylinder 160 is connected with the slider 190, and a lower end of the slider 190 is connected with the die flange 170 through connecting rods 191.

A lower plane of the die flange 170 is provided with a T-shaped groove for connecting with an upper die top plate 240 of the die. Flange guide rods 180 are embedded and fixed at four corners of an upper part of the die flange 170 to ensure rigidity and accuracy of guiding. Guide sleeves of the flange guide rods 180 are installed in the upper beam 150 of the hydraulic press.

Figure 2:
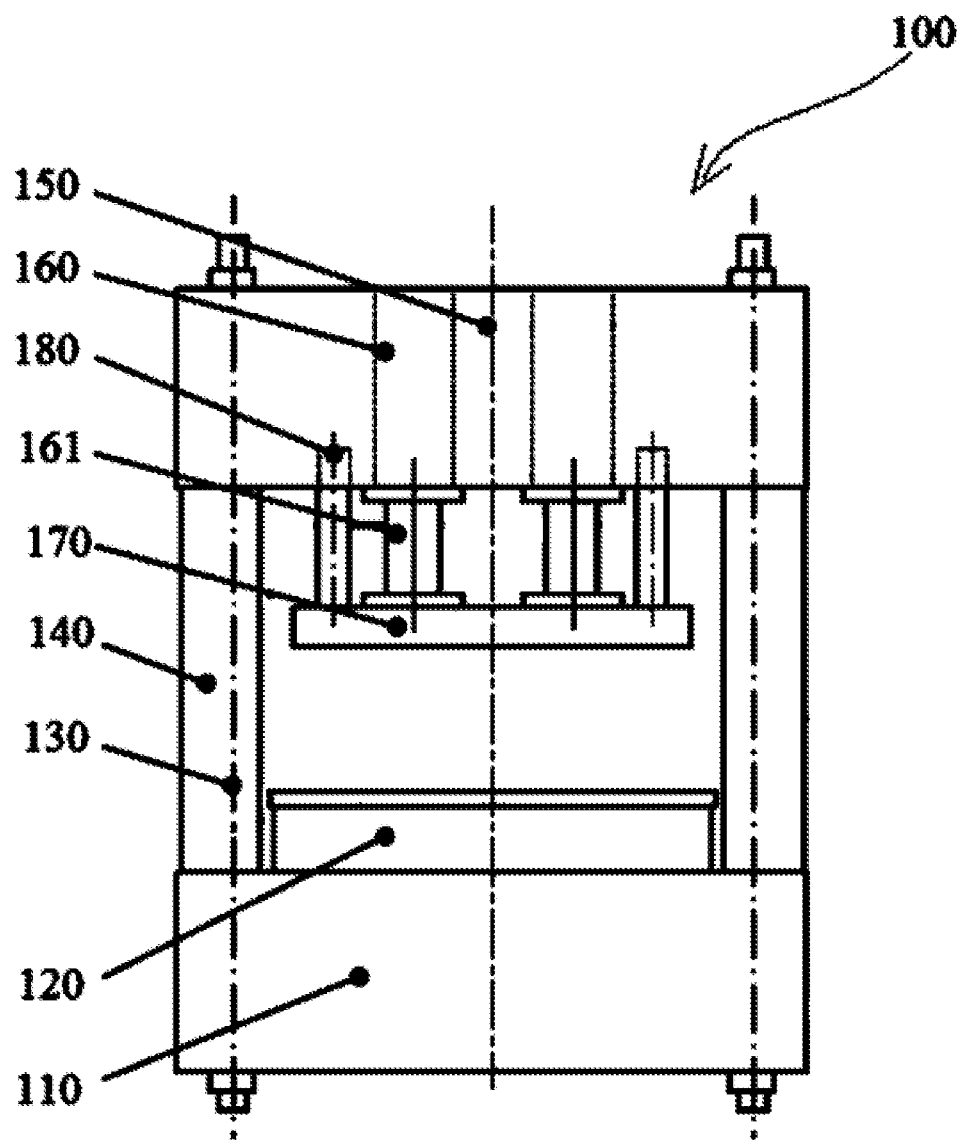
FIG. 2 is a schematic structural diagram of a hydraulic press of the embodiment of the hot metal gas forming and quenching system according to the present disclosure.

As shown in FIG. 2, the hydraulic press 100 can also be a hydraulic press without a slider, including a lower beam 110, a moving table 120, pulling rods 130, upright columns 140, an upper beam 150, a main cylinder 160, a die flange 170, and flange guide rods 180. The lower beam 110 and the upper beam 150 are supported and separated by the upright columns 140 to form a space for accommodating the movable table 120 and the die flange 170. The lower beam 110, the columns 140 and the upper beam 150 are fastened by the pulling rods 130. The moving table 120 is arranged on the lower beam 110, the main oil cylinder 160 and the flange guide rods 180 are all arranged on the upper beam 150, and the lower end of the piston rod 161 of the main oil cylinder 160 and the lower ends of the flange guide rods 180 are all connected with the die flange 170.

As shown in FIGS. 3-10, the die assembly 200 includes a core component and automatic loading and unloading modules. The automatic loading and unloading modules are arranged on two sides of the core component to provide loading and unloading of the workpiece W for the core component. The core component includes a low die bottom plate 210, a lower die holder 220, a lower die insert 230, an upper die top plate 240, an upper die holder 250, an upper die insert 260, a progressive die 270, a side pushing sealing oil cylinder module 280, and an electrode compression cylinder module 290. The lower die holder 220, the lower die insert 230, the progressive die 270, the upper die insert 260, the upper die holder 250, and the upper die top plate 240 are arranged on the lower die bottom plate 210 from top to bottom. The progressive die 270 includes a heating station 2B and a hot gas bulging and quenching station 2C. The die assembly 200 combines two operations of hot gas bulging and quenching forming, which greatly shortens processing time and avoids surface oxidation of products.

The electrode compression cylinder module 290 includes an electrode compression cylinder, and the side pushing sealing oil cylinder module 280 includes a side pushing sealing oil cylinder 281 and a side pushing sealing head 282.

Figure 4:
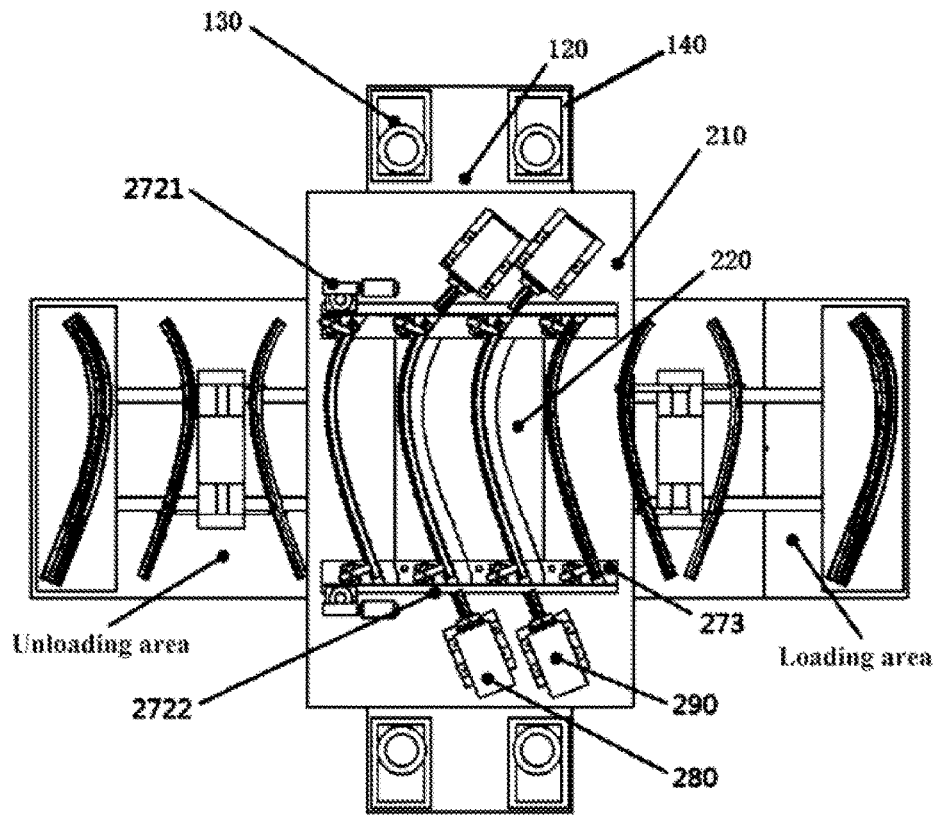
FIG. 4 is a top schematic structural diagram of the die assembly of the embodiment of the hot metal gas forming and quenching system according to the present disclosure.
Figure 5:
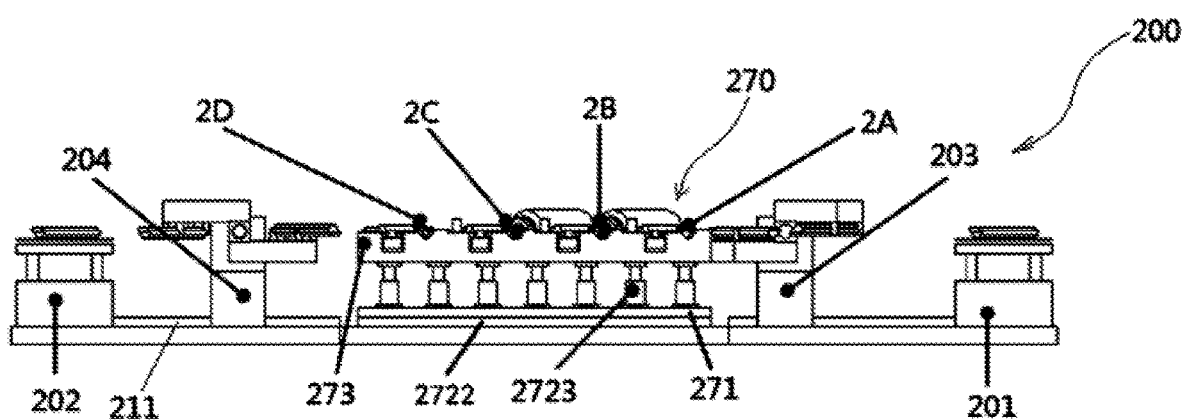
FIG. 5 is a side schematic structural diagram of the die assembly of the embodiment of the hot metal gas forming and quenching system according to the present disclosure.
Figure 8:
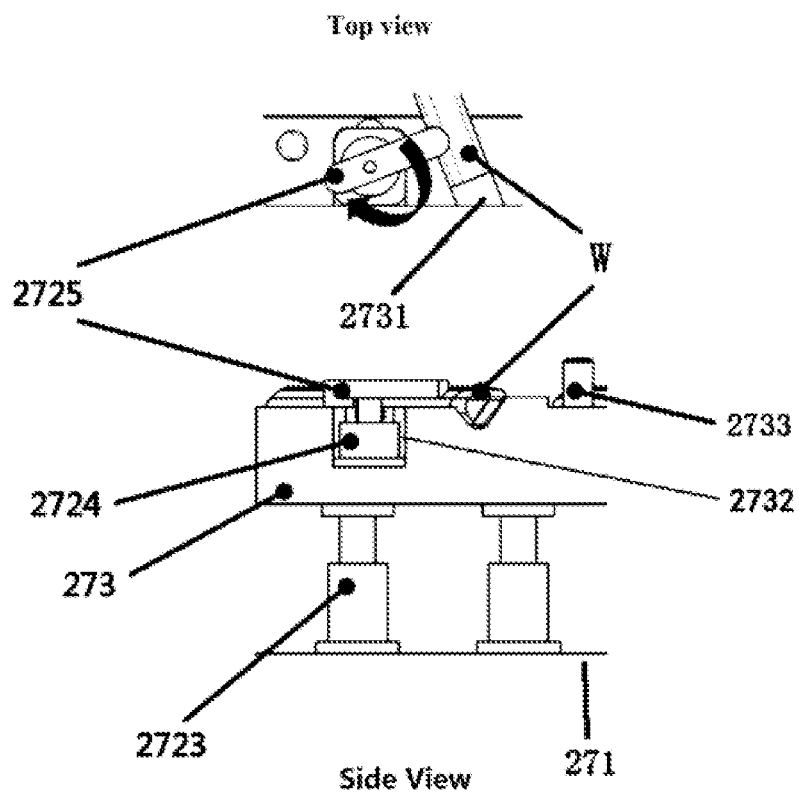
FIG. 8 shows a partial top schematic diagram and a side schematic diagram of FIG. 6.

As shown in FIGS. 4-5 and 8, the progressive die 270 includes a feeding bottom plate 271, a feeding module 272, and a feeding pallet 273. The feeding module 272 has a variety of driving functions, which can drive the feeding bottom plate 271 to translate from side to side and also drive the feeding pallet 273 to move up and down, and can also compress the workpieces W. Specifically, the feeding module 272 includes progressive die drives 2721, a progressive die drive guide bar 2722, lifting hydraulic cylinders 2723, rotatable compression cylinders 2724 and rotatable pressure plates 2725. The feeding pallet 273 is provided with a plurality of die cavities 2731 for accommodating ends of the workpieces W, and a plurality of hole slots 2732 for accommodating the rotatable compression cylinders 2724. Each die cavity 2731 corresponds to a different processing station, such as the feeding station 2A, the heating station 2B, the hot gas bulging and quenching station 2C, and the unloading and heat preservation station 2D. The feeding pallet 273 is also provided with guide post 2733 for positioning. The lifting hydraulic cylinders 2723 can push the feeding pallet 273 to stop at multiple heights, such as a lower limit positon at the lowest position, a joint position at a middle position, and an upper limit position for lifting the workpieces to enter into next station.

Figure 6:
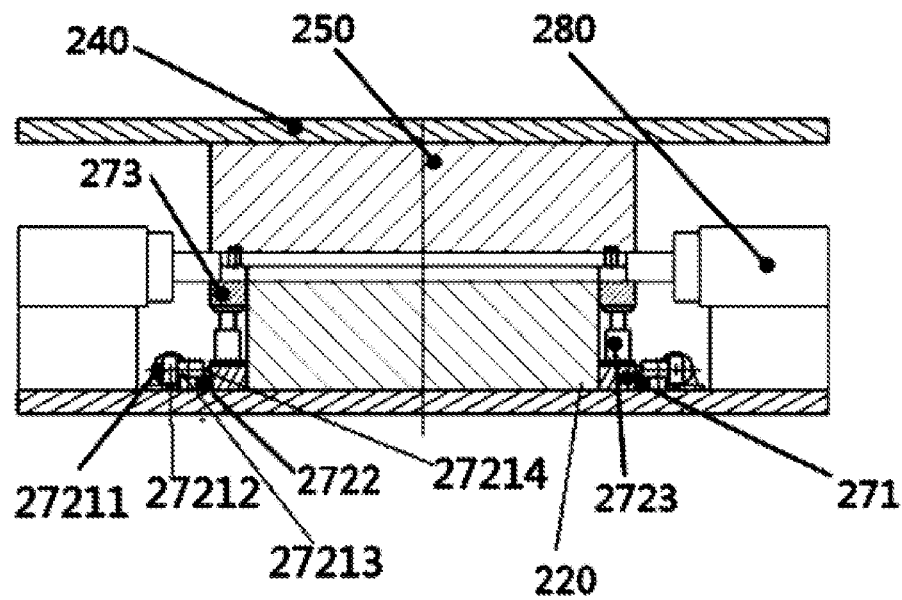
FIG. 6 is a front cross section schematic structural diagram of the die assembly of the embodiment of the hot metal gas forming and quenching system according to the present disclosure.

As shown in FIG. 6, the progressive die drive 2721 includes a drive motor 27211, a reducer 27212, a gear 27213, and a rack 27214. The drive motor 27211 is fixedly arranged on the lower die bottom plate 210, and the gear 27213 is connected to the drive motor 27211 through the reducer 27212 and engaged with the rack 27214, the rack 27214 is arranged on the feeding bottom plate 271, which forms a gear and rack transmission system.

Figure 7:
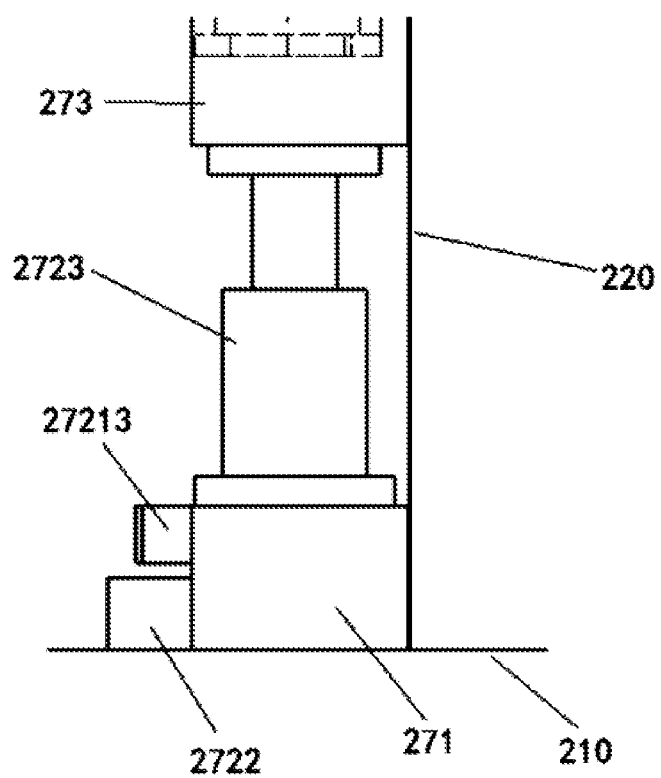
FIG. 7 is a partial enlarged schematic diagram of FIG. 6.

As shown in FIG. 7, the progressive die drive guide bar 2722 is fixedly arranged on the lower die bottom plate 210 and cooperates with the lower die holder 220 to guide translation of the feeding bottom plate 271. Under joint restriction of the progressive die drive guide bar 2722 and the lower die holder 220, the feeding bottom plate 271 is driven by the gear and rack transmission system formed by the gear 27213 and the rack 27214, to translate from side to side on the bottom die bottom plate 210.

Figure 3:
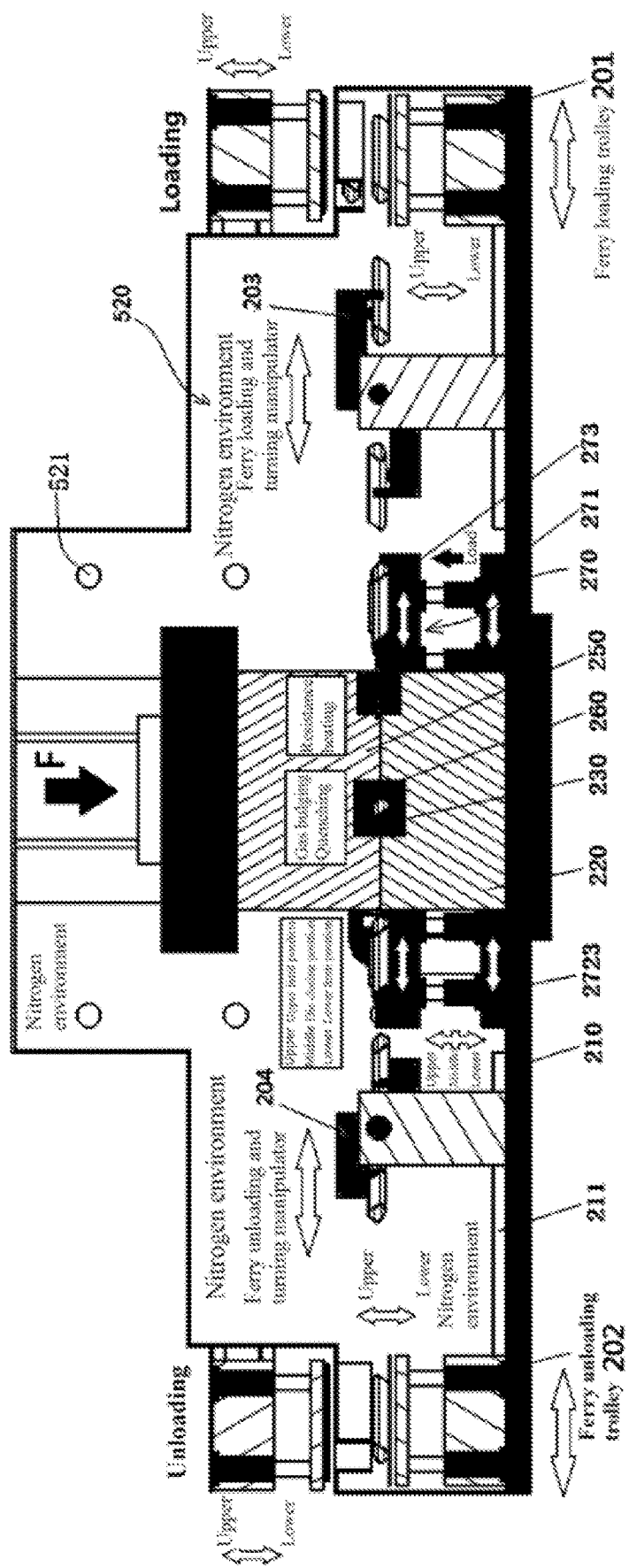
FIG. 3 is a cross section schematic structural diagram of a die assembly of the embodiment of the hot metal gas forming and quenching system according to the present disclosure, in which a material flow direction is from right to left.

As shown in FIG. 3, the automatic loading and unloading modules include a ferry loading trolley 201, a ferry unloading trolley 202, a ferry loading and turning manipulator 203, and a ferry unloading and turning manipulator 204. The ferry loading trolley 201, the ferry loading and turning manipulator 203, the core component, the ferry unloading and turning manipulator 204 and the ferry unloading trolley 202 are sequentially arranged on the lower die bottom plate 210 from left to right.

Figure 9:
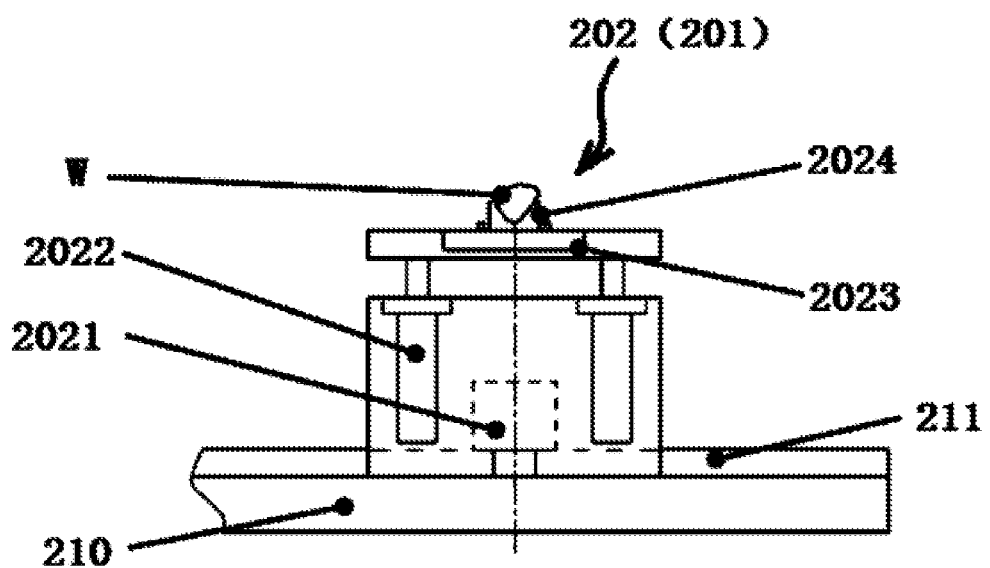
FIG. 9 is a schematic structural diagram of a ferry trolley in the die assembly of the embodiment of the hot metal gas forming and quenching system according to the present disclosure.

As shown in FIG. 9, the ferry loading trolley 201 and the ferry unloading trolley 202 have the same structure, and both include a linear drive 2021, jacking cylinders 2022, a trolley pallet 2023, and a workpiece clamping plate 2024. The linear drive 2021 is configured to drive the trolley to move left and right along the guide rail 211 on the lower die bottom plate 210. The jacking cylinders 2022 are used to lift the trolley pallet 2023. The workpiece clamping plate 2024 is arranged on the trolley pallet 2023 for clamping the workpiece W.

Figure 10:
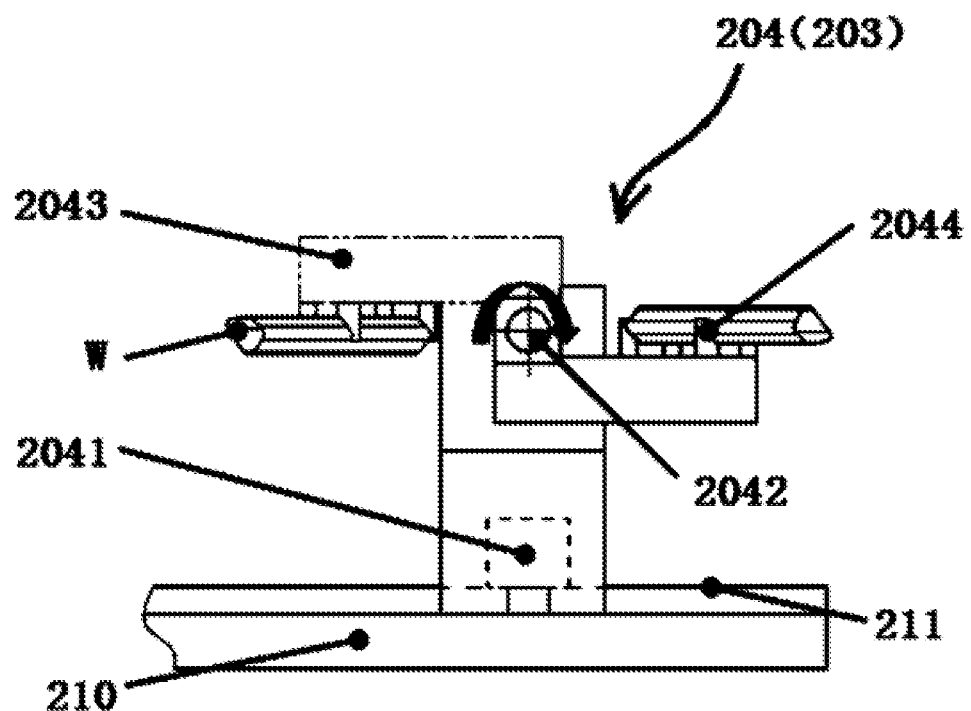
FIG. 10 is a schematic structural diagram of a turning manipulator in the die assembly of the embodiment of the hot metal gas forming and quenching system according to the present disclosure.

As shown in FIG. 10, the ferry loading and turning manipulator 203 and the ferry unloading and turning manipulator 204 have the same structure, and both include a linear drive 2041, a rotatable drive 2042, a rotatable mechanical arm 2043, and a clamping gripper 2044. The linear drive 2041 is used for driving the trolley to move left and right along the guide rails 211 on the lower die bottom plate 210. The rotatable drive 2042 is used to turn the rotatable mechanical arm 2043 so that the workpieces W can be turned 90 degrees or 180 degrees from bottom to top. The clamping gripper 2044 is used to grab the workpieces W.

Figure 11:
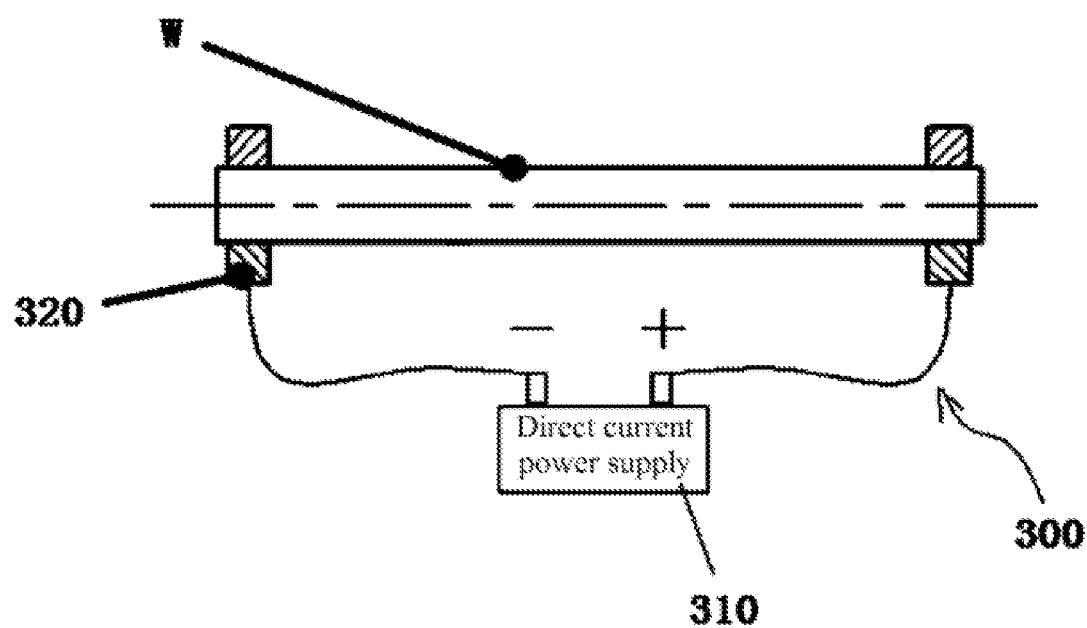
FIG. 11 is a schematic structural diagram of a rapid heating module of the embodiment of the hot metal gas forming and quenching system according to the present disclosure.

As shown in FIG. 11, it corresponds to the situation in which two ends of the workpiece W are not heated, the rapid heating module 300 includes a direct current power supply 310 and conductive clamping blocks 320. Two conductive clamping blocks 320 are respectively clamped at the two ends of the workpiece W. After the circuit is turned on, the direct current power supply 310 rapidly heats a middle part of the workpiece except for the two ends thereof, by means of resistance heating.

Figure 12:
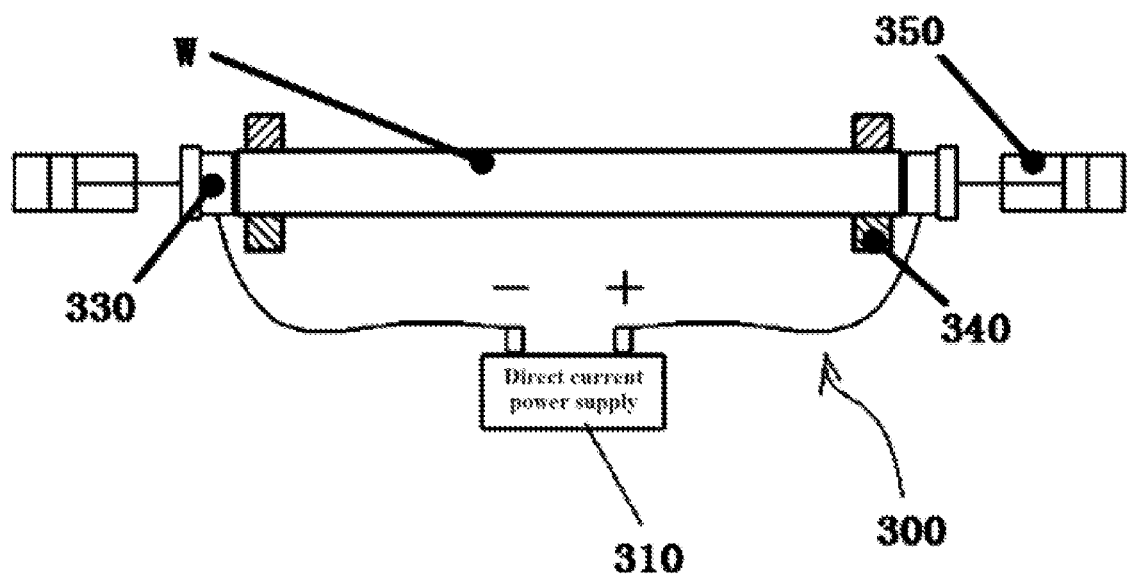
FIG. 12 is a schematic structural diagram of a rapid heating module of another embodiment of the hot metal gas forming and quenching system according to the present disclosure.

As shown in FIG. 12, it corresponds to the situation in which the two ends of the workpiece W need to be heated. When the two ends of the workpiece W need to be heated, the rapid heating module 300 includes a direct current power supply 310, conductive compression blocks 330, insulating clamping blocks 340, and electrode compression cylinders 350. Two conductive compression blocks 330 are respectively pressed against the two ends of the workpiece W tightly, and each conductive compression block 330 is pressed by one electrode compression cylinder 350 so that the electrode is in close contact with the end of the workpiece W. The two ends of the workpiece W are supported by the insulating clamping blocks 340.

Figure 13:
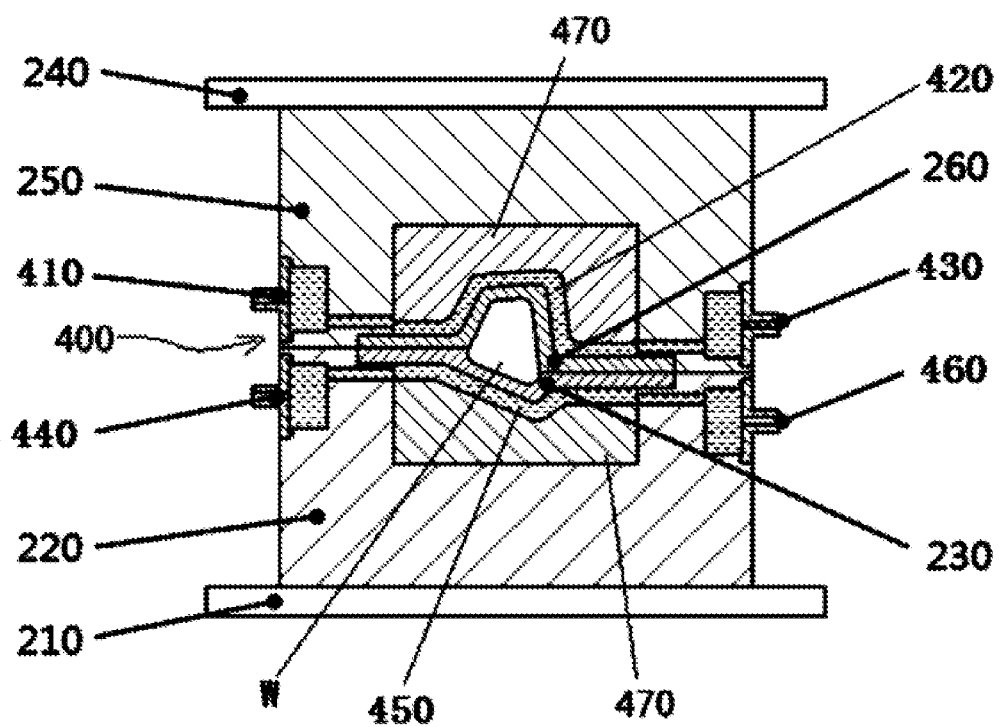
FIG. 13 is a cross-sectional schematic structural diagram of the rapid cooling module, during use, of the embodiment of the hot gas bulging and rapid cooling strengthening system for metal pipe according to the present disclosure.

As shown in FIG. 13, the rapid cooling module 400 includes an upper die inlet water channel 410, an upper die annular cooling water channel 420, an upper die outlet water channel 430, and further includes a lower die inlet water channel 440, a lower die annular cooling water channel 450, and a lower die outlet water channel 460. The water channels 460 are separated from the workpiece W by an upper die insert 260 or a lower die insert 230.

Figures 14A, 14B:
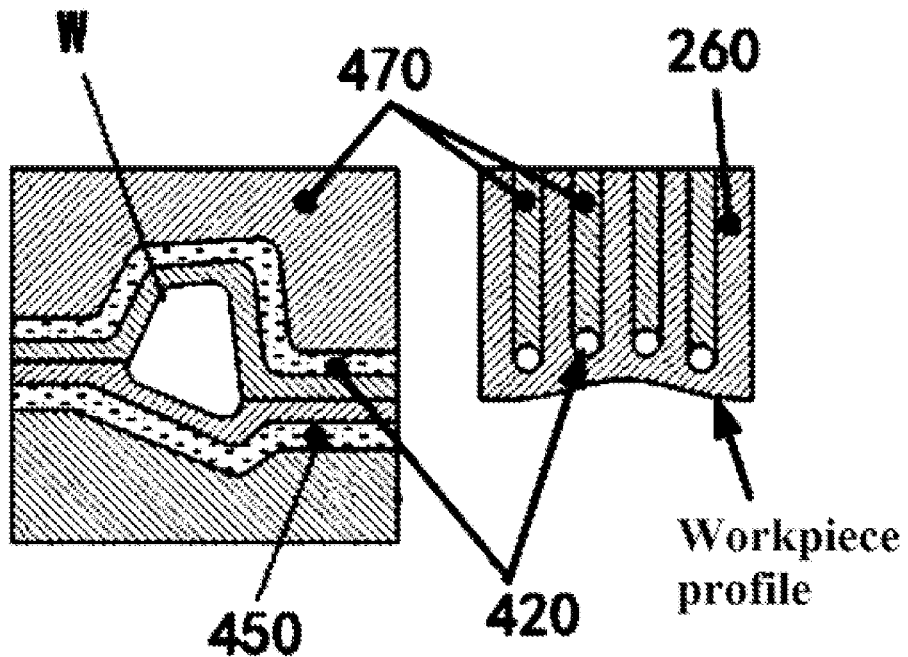

As shown in FIGS. 14A-14B, the upper die annular cooling water channel 420 is formed by a gap formed between the upper die insert 260 and the die insert 470, and the lower die annular cooling water channel 450 is formed by a gap formed between the lower die insert 230 and the die insert 470.

As shown in FIGS. 14 A-14B and 15, a plurality of the upper die annular cooling water channel 420 and the lower die annular cooling water channel 450 are provided. A distance D between each upper die annular cooling water channel 420 and a lower surface of the upper die insert 260 is equal, and a distance between the lower die annular cooling water channel 450 and an upper surface of the lower die insert 230 is equal. In some embodiments, a distance between the upper die annular cooling water channel 420 and a profile of the workpiece W is equal to a distance between the lower die annular cooling water channel 450 and the profile of the workpiece W, which facilitates uniform cooling of the workpiece.

Figure 15:
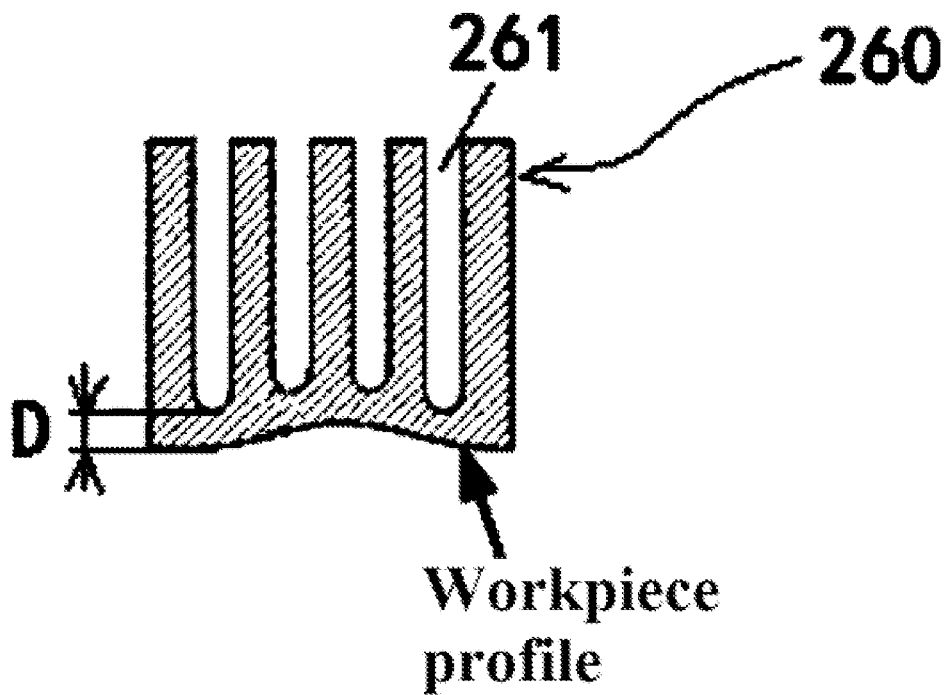
FIG. 15 is a cross-sectional schematic diagram of an upper die insert in FIG. 14B.

As shown in FIG. 15, a plurality of parallel deep grooves 261 are milled on the upper die insert 260. Each deep groove 261 is filled with the die insert 470, and a gap between the die insert 470 and the upper die insert 260 forms one upper die annular cooling water channel 420.

Similarly, multiple parallel deep grooves are milled on the lower die insert 230, and each deep groove is filled with the die insert 470, and a gap between each die insert 470 and the lower die insert 230 forms one lower die annular cooling water channel 450.

Figure 16:
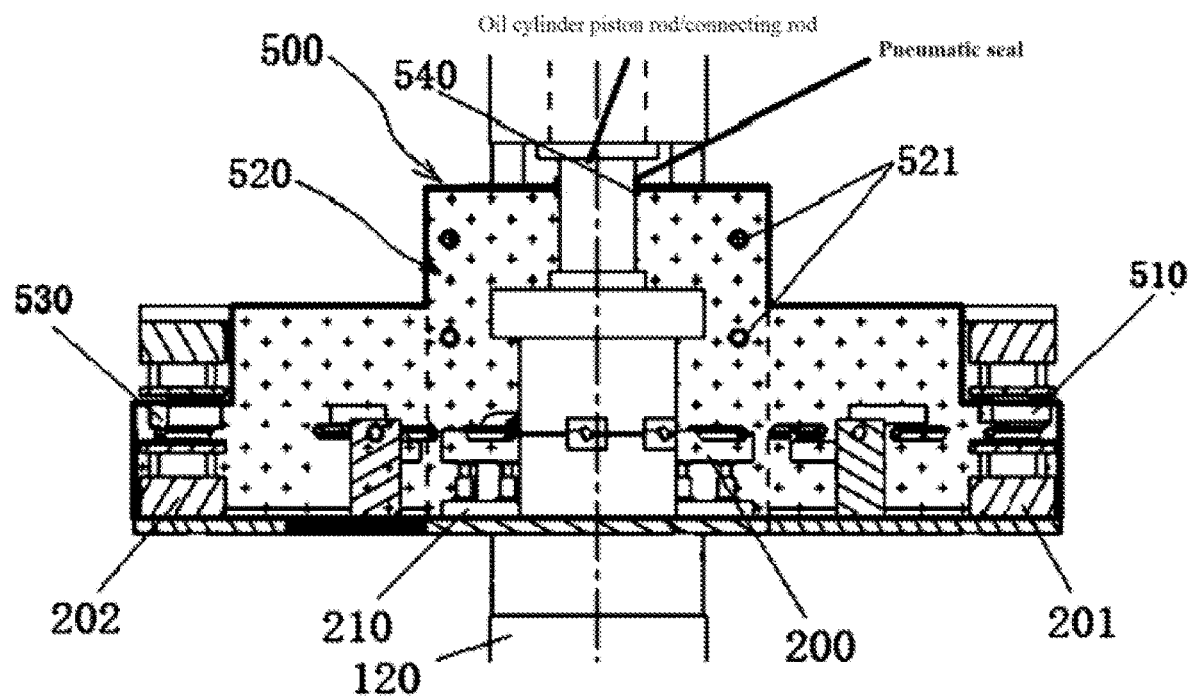
FIG. 16 is a schematic structural diagram of a safety protection and sealing module, during use, of the embodiment of the hot metal gas forming and quenching system according to the present disclosure.

As shown in FIG. 16, the safety protection and sealing module 500 includes a loading transition sealing gas chamber 510, a safety protection and sealing compartment 520 and an unloading transition sealing gas chamber 530. The loading transition sealing gas chamber 510 and the unloading transition sealing gas chamber 530 are arranged on two sides of the safety protection and sealing compartment 520 respectively. The safety protection and sealing module 500 covers the die assembly 200 therein to form a positive pressure sealing environment. The safety protection and sealing module 500 can provide a positive pressure and sealed environment for the hot gas bulging and rapid cooling strengthening process for metal pipes, thereby avoiding product surface oxidation.

The safety protection and sealing module 500 is made of thick steel plates which are provided around the die assembly 200 and over upper and lower surfaces thereof. A bottom surface of the safety protection and sealing module 500 is installed centrally on the moving table 120 of the hydraulic press, and the lower die bottom plate 210 of the die is installed on a lower steel plate of the safety protection and sealing module 500.

The safety protection and sealing module 500 is provided with a sealing hole 540 in the thick steel plate. The sealing hole 540 is matched with the main cylinder piston rod 161 of the hydraulic press 100, the die flange guide rod 180 or the adapting rod 191 according to a Pneumatic seal standard, and a Pneumatic seal ring (not shown) is installed within the sealing hole 540.

Figures 17A, 17B, 17C:
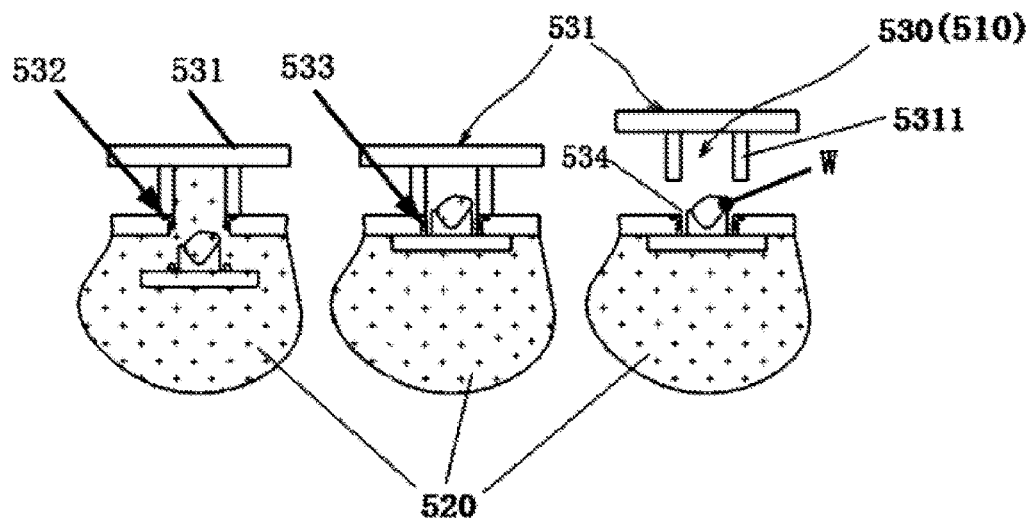
FIGS. 17A-17C show a schematic structural and flow diagram of a transition sealing gas chamber of the safety protection and sealing module of the embodiment of the hot metal gas forming and quenching system according to the present disclosure; viewed from FIG. 17A to FIG. 17C, it is an unloading process of the unloading transition sealing gas chamber, viewed from FIG. 17C to FIG. 17A, it is a loading process of a loading transition sealing gas chamber.

As shown in FIGS. 17A-17C, it is a schematic diagram showing states where the workpiece W enters and exits the safety protection and sealing module 500. Viewed from left to right, it is an unloading process of the unloading transition sealing gas chamber 530, and viewed from right to left, it is a loading process of the loading transition sealing gas chamber 510. Taking the view from left to right as an example, the workpiece W is clamped by the ferry unloading and turning manipulator 204 at the heat preservation station 2D to the trolley pallet 2023 of the ferry unloading trolley 202. The ferry unloading trolley 202 travels to be directly below the unloading transition sealing gas chamber 530, and then raised, so that the pallet 2023 abuts a lower part of the unloading transition sealing gas chamber 530 to form a close contact therebetween, thereby preventing gas leakage. Then an upper cover plate 531 of the unloading transition sealing gas chamber 530 is lifted, and the workpiece W leaves the unloading transition sealing gas chamber 530, and can be taken away by the manipulator or a worker. In order to prevent gas leakage when the workpiece W enters and exits the safety protection and sealing module 500, several sealing rings (532, 533) are added at a position where the unloading transition sealing gas chamber 530 contacts the trolley pallet 2023.

The loading transition sealing gas chamber 510 has the same structure as the unloading transition sealing gas chamber 530. The loading transition sealing gas chamber 510 includes a material inlet and the upper cover plate 531, and the material inlet is arranged on an upper part of the safety protection and sealing compartment 520. The unloading transition sealing gas chamber 530 includes a material outlet 534 and the upper cover plate 531. The material outlet 534 is arranged on the upper part of the safety protection and sealing compartment 520. The material inlet and the material outlet 534 are respectively arranged on two sides of the safety protection and sealing compartment 520. The upper cover plate 531 can completely cover the material inlet and the material outlet 534.

Two parallel flanges 5311 are provided at a lower part of the upper cover plate 531, and a distance between the two flanges 5311 is the same as an opening width of the material inlet and the material outlet 534

A first sealing ring 532 is provided on a side wall of the material inlet or the material outlet 534 to form a sealing engagement with the workpiece clamping plate configured for transporting the workpiece W. A second sealing ring 533 is provided on the upper surface of the material inlet or the material outlet 534, so as to to form a sealing engagement with the flanges 5311 of the upper cover plate 531.

Figure 18:
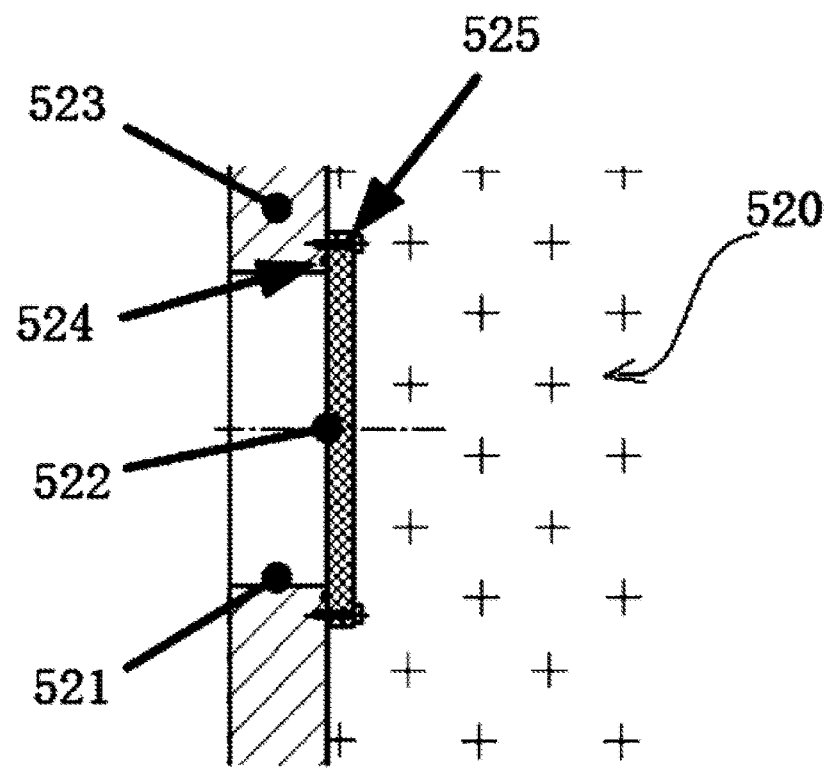
FIG. 18 is a schematic structural diagram of a pressure relief hole of the safety protection and sealing module of the embodiment of the hot metal gas forming and quenching system according to the present disclosure.

As shown in FIG. 18, a pressure relief hole 521 is provided on the safety protection and sealing compartment 520. Multiple pressure relief holes 521 are provided, which can automatically burst when the pressure in the safety protection and sealing compartment 520 is too high, so as to relieve the pressure in the safety protection and sealing compartment 520.

A pressure relief film 522 is provided on an inner side wall of the safety protection and sealing compartment 520 where the pressure relief hole 521 is provided, and is fixed by a fastener 525 such as a screw. A third sealing ring 524 is provided between the pressure relief film 522 and the inner side wall of the safety protection and sealing compartment 520 to prevent gas leakage. Apparently, other forms of safety means can also be arranged in the safety protection and sealing compartment 520. For example, a pressure valve similar to a pressure cooker is arranged on the safety protection and sealing compartment 520, and the valve can release pressure when the pressure valve is lifted; or a spring is arranged in the pressure valve, the spring is lifted when the pressure exceeds a predetermined value, the pressure valve releases the pressure.

Figure 19:
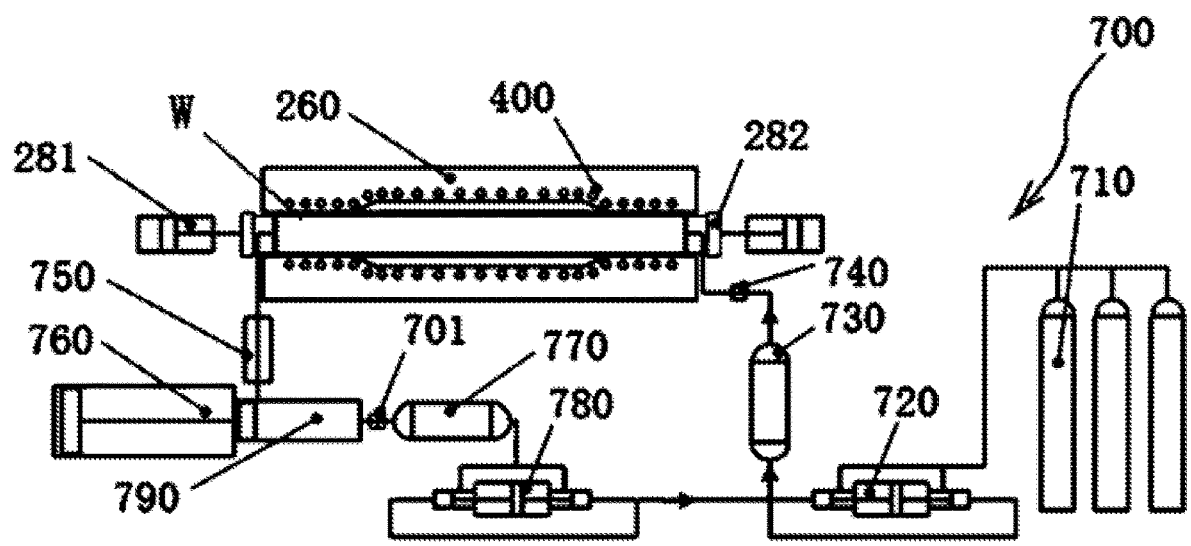
FIG. 19 is a schematic structural diagram of an ultra-high pressure gas circulation control module of the embodiment of a closed hot metal gas forming and quenching system according to the present disclosure.

As shown in FIG. 19, the ultra-high pressure gas circulation control module 700 includes a nitrogen tank assembly 710, a first two-way booster 720, a high-pressure gas storage tank 730, an inflation valve 740, a gas cooler 750, a rapid boosting oil cylinder 760, and a low-pressure gas storage tank 770 and a second two-way booster 780. The first two-way booster 720 is respectively connected to the nitrogen tank assembly 710, the high-pressure gas storage tank 730 and the second two-way booster 780, the high-pressure gas storage tank 730 is connected with the inflation valve 740. The gas cooler 750 is connected to the rapid boosting oil cylinder 760, the rapid boosting oil cylinder 760 is connected to the low-pressure gas storage tank 770, and the low-pressure gas storage tank 770 is connected to the second two-way booster 780.

The rapid boosting oil cylinder 760 has a low pressure cylinder cavity 790. A gas inlet end of the low pressure cylinder cavity 790 is connected to the gas cooler 750. The gas outlet end of the low pressure cylinder cavity 790 is connected with the second two-way booster 780 through a check valve 701.

Ends of the inflation valve 740 and the gas cooler 750 are provided with high temperature solenoid valves for tightly connecting with a cavity port of the workpiece W, so that ultra-high pressure gas can be filled into a cavity of the workpiece W to achieve high temperature bulging.

A volume of the low-pressure cylinder cavity 790 is usually 10-100 times larger than that of a target workpiece W, in order to fully absorb the high-pressure gas after the workpiece is formed, and reduce residual gas pressure inside the pipe workpiece W. The volume of the low-pressure cylinder cavity 790 can be larger if space is enough.

When inert gas or carbon dioxide is used as a protective gas in the gas bulging and rapid cooling strengthening process for the metal pipe, the nitrogen tank assembly 710 can be replaced by an inert gas tank assembly or a CO 2 gas tank assembly.

The first two-way booster 720 pressurizes low-pressure nitrogen in the gas storage tank assembly 710 into the high-pressure gas storage tank 730, and inflates the heated pipe workpiece W through the inflation valve 740. After the workpiece W is bulged and quenched, the gas in the pipe cavity is heated. The high-pressure hot gas is cooled by the gas cooler 750, and then released into the low-pressure cylinder cavity 790 of the rapid boosting oil cylinder 760 (an initial state therein is close to vacuum). When the gas pressure in the low-pressure cylinder cavity 790 is close to the gas pressure inside the pipe, the gas recovery is over. The residual gas in the pipe workpiece W can be released into the safety protection and sealing compartment 520 after the die is opened, which can be used for continuous supplementation of the protective gas environment pressure. Then, the rapid boosting oil cylinder 760 quickly compresses the low-pressure nitrogen absorbed by the low-pressure cylinder cavity 790 into the low-pressure gas storage tank 770, and the rapid boosting oil cylinder 760 retracts to a final position after being pushed to the limit position (at this time, the pressure in the low-pressure cylinder cavity 790 is again return to a state close to the vacuum). During this process, the check valve 701 prevents the gas in the low-pressure gas storage tank 770 from returning to the low-pressure cylinder cavity 790. The second two-way booster 780 continues to pressurize the recovered gas in the low-pressure gas storage tank 770, the pressurized gas enters the high-pressure gas storage tank 730 through the first two-way booster 720, for subsequent bulging of the workpiece. This process is circulated.

The ultra-high pressure gas circulation control module 700 overcomes the safety problem existing in ultra-high pressure gas pressure and high temperature heating equipment in the prior art.

The present disclosure provides the hot gas bulging and rapid cooling strengthening process for metal pipes, including the following steps:

1) The metal pipe workpiece W is fed into the die of the die assembly 200 in the hot-gas bulging forming machine via the automatic loading and unloading modules, and heated at the heating station 2B quickly by the direct current power supply of the rapid heating module 300;

2) the heated workpiece W enters the hot gas bulging and quenching station 2C, and it is first subjected to the hot gas bulging operation, and then the quenching operation;

3) the workpiece W is taken out from the die through the automatic loading and unloading modules.

Due to excellent mechanical properties of titanium metal, no quenching operation is required during hot gas bulging. Therefore, in the hot gas bulging and rapid cooling strengthening process for metal pipes of the present disclosure, the quenching and heat preservation operations in the steps 2), 3) can be omitted when titanium metal is processed.

In order to prevent the workpiece W from being oxidized during heating, nitrogen, carbon dioxide, or inert gas may be introduced into the die of the die assembly 200 to protect the workpiece W from oxidation.

The die of the die assembly 200 is preferably a progressive die 270.

In order to achieve better sealing and anti-oxidation effects, the entire die assembly 200 is provided in a sealed environment created by the safety protection and sealing module 500.

Optionally, for some parts that require heat preservation after quenching, there is a heat preservation step between step 2) and step 3). The quenched workpiece W enters the unloading heat preservation station 2D, and is kept at medium and low temperatures for a predetermined time to adjust strength and toughness of the parts.

Preferably, heating, bulging, rapid cooling strengthening and heat preservation of the workpiece W is completed on the die assembly 200.

The quenching operation is performed by the rapid cooling module 400.

The sealing environment is provided by the safety protection and sealing module 500.

The ultra-high-pressure gas circulation control module 700 provides high-pressure gas to the die assembly 200.

It is worth noting that, alternatively, the hot gas bulging in the process of the present disclosure can be replaced by hot liquid bulging, and the workpiece W is filled with high-pressure liquid to complete the bulging of the workpiece W.

The present disclosure also provides a typical flow of the hot gas bulging and rapid cooling strengthening process for closed metal pipes, including the following steps:

1) A target part of the workpiece W to be processed is A pillar of a car body. The tube blank is made of material 22MnB5 (high-strength steel or high-strength aluminum alloy and other materials that can be quenched and strengthened), has an outer diameter of 50 mm, a wall thickness of 2 mm (or unequal thickness tube), and a length of 1800 mm.

2) The 22MnB5 uncoated plate is made into uncoated steel pipe blank or section steel with required specifications by welding or extrusion, drawing, rolling and other methods. The uncoated steel pipe enters a production line after cutting, deburring, cleaning and other preparation processes.

3) When the target part is a part with a curved axis, the steel pipe is first bent to obtain a bending pipe as an intermediate process part. The bending methods include computer numeric control bending, push bending, roll bending, press bending, etc. If the previous pipe-making process adopts a rolling method to make a pipe, a special-shaped cross-section curved steel roll forming process can be used in the pipe-making process, an intermediate process part with the special-shaped cross-section bending axis can be made through welding.

4) When necessary, a pre-forming process is performed for the bending intermediate process part or a straight pipe, and the intermediate process part is squeezed so that it can be smoothly placed into the die cavity of the bulging process, and a better material initial distribution state is obtained.

5) An initial state of the safety protection and sealing compartment 520 is set as a pure anti-oxidation positive pressure gas environment (nitrogen, inert gas or $CO_2$ etc.), and a positive pressure is recommended to be 1.5-2.0 atmospheres.

6) Transition into the compartment: first, the upper cover plate 531 in the loading transition sealing gas chamber 510 is opened. At this time, the upper cover plate 531 and the trolley pallet 2023 of the ferry loading trolley 201 are at an upper limit position. The uncoated steel pipe, section steel or pre-formed uncoated plate steel pipe workpiece W is placed on a profile support of the trolley pallet 2023 of the ferry loading trolley 201. The upper cover plate 531 descends to a lower limit position, and the loading transition sealing gas chamber 510 is closed. The gas circulation system releases low-pressure nitrogen from one end of the loading transition sealing gas chamber 510 into the loading transition sealing gas chamber 510, and gas is exhausted from the other end of the loading transition sealing gas chamber 510 to complete gas replacement. The trolley pallet 2023 of the ferry loading trolley 201 descends from the upper limit position to the lower limit position. Newly entering workpieces (newly entering workpiece, relative to the workpieces already in each processing position, be called newly entering workpieces for short) W are transported through the automatic loading and unloading modules. The newly entering workpieces enter from the loading transition sealing gas chamber 510 into the safety protection and sealing compartment 520 with a sealed environment and a safe press relief structure within the hot gas bulging forming machine (hydraulic press 100) to finally complete a transition into the compartment.

7) ferry loading: when loading, the ferry loading trolley 201 is at an outer limit position. After the loading is completed, the ferry loading trolley 201 is pushed by the linear drive 2021 from the outer limit position towards one side of the progressive die 270 to translate to an inner limit position along the guide rail 211 (at this time, no interference of the loading transition sealing gas chamber 510 above the newly entering workpiece W). After the ferry loading and turning manipulator 203 moves from its inner limit position along the guide rail 211 to the outer limit position, the rotatable drive 2042 of the manipulator 203 drives the rotatable mechanical arm 2043 to flip from a default vertical position to an outer side, and the clamping gripper 2044 clamps the newly entering workpiece W, and then the rotatable mechanical arm 2043 rotates to the vertical position, so the loading action performed before opening the die is completed.

After the hydraulic press opens the die, the upper die moves up to the upper limit position. At this time, except for the rotatable compression cylinders 2724 at the loading station 2A, other rotatable compression cylinders 2724 at all stations quickly enter an compression state (otherwise when the lifting hydraulic cylinder 2723 rise, the workpieces on these stations are skewed), and then the lifting hydraulic cylinder 2723 of the feeding module 272 is raised from the closing position to the upper limit position (at this time, the feeding pallet 273 is at a loading side limit position, the feeding pallet 273 is also at the upper limit position in height. [Loading action after die opening]: the ferry loading turning manipulator 203 moves to the inner limit position along the guide rail 211, and the rotatable mechanical arm 2043 turns to the inner side limit position, and place the newly entering workpiece W on the loading station 2A on the feeding pallet 273. The rotatable compression cylinder 2724 and the rotatable pressure plate 2725 at the loading station 2A rotate to a position pressing the material while pressing down, to compress the workpiece W. The clamping gripper 2044 of the manipulator 203 loosens the workpiece W, and the rotatable mechanical arm 2043 rotates and resets to the vertical position. The ferry loading action is completed.

8) multi-station progression: after the ferry loading action is completed, the feeding pallet 273 is at the upper limit position. The feeding bottom plate 271 is driven by the progressive die drive 2721 to bring the feeding pallet 273 to translate from the loading side limit position to an unloading side limit position. The workpieces on all the stations are lifted by the feeding pallet 273 and translated to the unloading side limit position. At this time, the electrode compression cylinder and the piston rod of the side pushing sealing oil cylinder 281 are in a retracted limit position, the side pushing sealing head 282 and the feeding pallet 273 do not interfere in the vertical and horizontal directions. After the feeding bottom plate 271 moves to the unloading side limit position, at this time, the newky entering workpiece is fed from the loading station 2A to be directly above the heating station 2B. At the same time, under the same action, the workpiece on the heating station 2B is fed to be just above the hot gas bulging and quenching station 2C, and the workpiece on the hot gas bulging and quenching station 2C is fed to be directly right above the unloading and heat preservation 2D. The workpiece on the unloading and heat preservation station 2D is fed to be directly right above the clamping gripper 2044 (the gripper is in the open state) of the rotatable mechanical arm 2043 of the ferry unloading and turning manipulator 204. Then, the lifting hydraulic cylinder 2723 is lowered from the upper limit position to the closing position, and then the clamping gripper 2044 clamps the workpiece W. Furthermore, the rotatable compression cylinders 2724 at all stations rise from the lower limit position to the upper limit position, and the rotatable pressure plate 2725 releases the workpiece W and rotate by 90° to keep off both ends of the workpiece. Then the rotatable mechanical arm 2043 of the ferry unloading and turning manipulator 204 is rotated to the vertical position (at this time, the clamping gripper 2044 is clamping the workpiece W to be unloaded), and move along the guide rail 211 to the outer limit position to keep off the upper die structure after the hydraulic press is pressed down, and also prepare for subsequent unloading and leaving of the workpiece from the compartment. The lifting hydraulic cylinder 2723 descends from the closing position to the lower limit position, and the feeding pallet 273 descends accordingly to the lower limit position, and then the feeding bottom plate 271 is reversely driven by the progressive die drive 2721 to bring the feeding pallet 273 to translate from the unloading side limit position to the loading side limit position. During this translation, the workpieces W on the heating station 2B, the hot gas bulging and quenching station 2C, and the unloading and heat preservation station 2D do not move due to supporting action of the lower die, and do not interfere with the rotatable pressure plate 2725 loosening the workpiece. After the feeding bottom plate 271 is translated to the loading side limit position, the lifting hydraulic cylinder 2723 is lifted from the lower limit position to the die closing position, and the feeding pallet 273 rises to the die closing position synchronously. At this point, the multi-station progressive action is completed, and the workpieces W in all positions has completed a feeding cycle.

9) closing die and loading: after the feeding module 272 completes the multi-station progression, the hydraulic press is pressed from the upper limit position to the lower limit position, and the die closing action is completed. Then the piston rods of the electrode compression cylinder and the side pushing sealing oil cylinder 281 move toward the workpiece port to the sealing position to complete sealing and clamping. The lifting hydraulic cylinder 2723 loads upward (with a small displacement), so that the feeding pallet 273 abuts the upper die holder (and the upper die holder does not interfere with the rotatable pressure plate 2725 in the state of loosening the workpiece), and at the same time the workpiece W of each process is fully clamped. The clamping force at this stage should be sufficient to ensure the sealing effect that the feeding pallet 273 always abuts the upper die holder and the workpiece port when the gas bulging force is the largest.

After the die is closed, rapid heating, hot gas bulging+ rapid cooling, heat preservation, unloading and loading preparation processes are carried out at the same time. The respective process action is described separately below.

10) rapid heating: after the hydraulic press is closed, the rapid heating module 300 is activated, and the workpiece W on the heating station 2B is clamped and started to be rapidly heated.

11) hot gas bulging and rapid cooling: after the hydraulic press is closed, the two ends of the workpiece W on the hot gas bulging and quenching station 2C are sealed by the side pushing sealing head 282, and the high-pressure gas enters the high temperature workpiece W through a vent pipe of the sealing head 282. The workpiece W is bulged to abut the die, and then the heat of the high-temperature workpiece W is taken away by the upper and lower die inserts (230, 260) with cooling water channels in the die, and the workpiece W is cooled from 700-900° C. at a rate of more than 27K/s to 200-300° C., and then quenching strengthening is realized, and the residual temperature is reserved to prepare for die opening.

12) heat preservation: after the hydraulic press closes the die, the workpiece W is kept at a certain temperature at the unloading and heat preservation station 2D to adjust the strength and toughness thereof.

13) unloading and leaving the compartment: the ferry unloading and turning manipulator 204 transfers the workpiece W to the ferry unloading trolley 202, and the ferry unloading trolley 202 transfers the workpiece W to the unloading transition sealing gas chamber 530, so as to realize actions symmetrical to the transitional entering compartment and the ferry loading, and the unloading and leaving the compartment is completed. The formed workpiece W is transferred to the subsequent cutting processing station by the robot or worker.

14) preparing for loading: at the same time, the transitional entering compartment action and the ferry loading action are performed again before opening the die.

15) opening the die: after the rapid heating, hot gas bulging+rapid cooling, heat preservation, unloading and loading preparation actions are completed, the die is opened by the hydraulic press, the side pushing sealing oil cylinder 281 and the electrode compression cylinder are retracted. [loading action after die opening] repeat the start: the lifting hydraulic cylinder 2723 of the progressive die 270 moves up to the upper limit position, so that the feeding pallet 273 rises to the upper limit position, and the rotatable compression cylinder 2724 moves down to compress the workpiece. Then the next multi-station progression is started, and so on.

16) In the progressive die 270 in the hot gas bulging forming machine (hydraulic press 100), the rapid heating module 300 performs resistance heating at the heating station 2B to achieve rapid heating.

17) The heated workpiece W enters the hot gas bulging+ quenching station 2C, and the hot gas bulging operation is performed first, and then the quenching operation is performed.

18) The quenched workpiece W enters the unloading and heat preservation station and kept at a certain temperature for a predetermined time.

19) The heat-preserved workpiece W is taken out from the sealed environment by the automatic loading and unloading modules.

The above content is description of the present disclosure in combination with specific preferred modes. It cannot be considered that the specific embodiments of the present disclosure are limited thereto. For those of ordinary skill in the art to which the present disclosure belongs, without departing from the concept of the present disclosure, several simple deductions and substitutions can be made, and they will all be regarded as belonging to the protection scope determined by the claims submitted by the present disclosure.

What is claimed is:
1. A hot metal gas forming and quenching system, comprising
  a hydraulic press, a die assembly, a rapid heating module, and a rapid cooling module, wherein the die assembly, the rapid heating module, and the rapid cooling module are arranged on or around the hydraulic press;
  wherein the die assembly comprises:
  a core component; an automatic loading module; and an automatic unloading module;
    wherein the automatic loading and unloading modules are arranged on two sides of the core component and load and unload the workpieces for the core component;
  wherein the core component comprises:
  a lower die bottom plate, a lower die holder, a lower die insert, an upper die top plate, an upper die holder, an upper die insert, a progressive die, a plurality of side pushing sealing oil cylinder modules, and a plurality of electrode compression cylinder modules;
    wherein the lower die holder, the lower die insert, the progressive die, the upper die insert, the upper die holder, and the upper die top plate are arranged sequentially from top to bottom on the lower die bottom plate;
      wherein the progressive die comprises a feeding bottom plate, a feeding module, and a feeding pallet;
      wherein the feeding module comprises progressive die drives, progressive die drive guide bars, lifting hydraulic cylinders, rotatable compression cylinders, and rotatable pressure plates; and the feeding module moves the feeding bottom plate from side to side and moves the feeding pallet up and down;
      and wherein the feeding pallet is provided with a plurality of die cavities for accommodating ends of workpieces and a plurality of hole slots for accommodating the rotatable compression cylinders.

2. The hot metal gas forming and quenching system according to claim 1, wherein the rapid cooling module comprises an upper die inlet water channel, an upper die annular cooling water channel, an upper die outlet water channel, a lower die inlet water channel, a lower die annular cooling water channel, and a lower die outlet water channel; the upper die annular cooling water channel is formed by a gap formed between an upper die insert and an die insert; the lower die annular cooling water channel is formed by a gap between an lower die insert and the die insert.

3. The hot metal gas forming and quenching system according to claim 1, further comprising a safety protection and sealing module, wherein a working area of the die assembly is arranged in a positive pressure space formed by the safety protection and sealing module.

4. The hot metal gas forming and quenching system according to claim 3, wherein the safety protection and sealing module comprises a loading transition sealing gas chamber, a safety protection and sealing compartment, and an unloading transition sealing gas chamber; the loading transition sealing gas chamber and the unloading transition sealing gas chamber are arranged on two sides of the safety protection and sealing compartment, the safety protection and sealing compartment forms a positive pressure sealing environment, the die assembly is provided in the positive pressure sealing environment.

5. The hot metal gas forming and quenching system according to claim 1, further comprising a control system for controlling the hydraulic press, the die assembly, the rapid heating module, and the rapid cooling module.

6. The hot metal gas forming and quenching system according to claim 1, further comprising an ultrahigh pressure gas circulation control module comprising a nitrogen tank assembly, a first two-way booster, a high-pressure gas storage tank, an inflation valve, a gas cooler, a rapid boosting cylinder, a low-pressure gas storage tank, and a second two-way booster, the first two-way booster is connected to the nitrogen tank assembly, the high-pressure gas storage tank, and the second two-way booster, and the high-pressure gas storage tank is connected to the inflation valve, the gas cooler is connected to the rapid boosting cylinder, the rapid boosting-cylinder is connected to the low-pressure gas storage tank, and the low-pressure gas storage tank is connected to the second two-way booster.

7. A hot metal gas forming and quenching process using the hot metal gas forming and quenching system according to claim 1, comprising the following steps:
step (1) loading the workpieces into a die of the die assembly through the automatic loading module and the automatic unloading module gf the hot metal gas forming and quenching system; heating the workpieces quickly by a direct current power supply of the rapid heating module at a heating station;
step (2) performing a hot gas bulging operation, followed by a quenching operation; and
step (3) taking the heated workpieces out of the die of the die assembly through the automatic loading module and the automatic unloading module.

8. The hot metal gas forming and quenching process according to claim 7, wherein when the workpieces are made of titanium, the quenching operation in the step (2) is omitted.

9. The hot metal gas forming and quenching process according to claim 7, wherein nitrogen, carbon dioxide, or inert gas is introduced into the die of the die assembly to protect the workpieces during the heating from an oxidation.

10. The hot metal gas forming and quenching process according to claim 9, wherein the die of the die assembly is the progressive die.

11. The hot metal gas forming and quenching process according to claim 7, wherein the die assembly is arranged in the positive pressure sealing environment created by the safety protection and sealing module.

12. The hot metal gas forming and quenching process according to claim 7, wherein a heat preservation step is provided between the step (2) and the step (3), quenched workpieces are delivered to an unloading and heat preservation station and kept at a desired temperature for a predetermined time.

13. The hot metal gas forming and quenching process according to claim 7, wherein the hot gas bulging operation is replaced by a liquid bulging operation, and a high-pressure liquid is poured into the workpieces, thereby completing bulging of the workpieces.

* * * * *